(12) United States Patent
Hwang et al.

(10) Patent No.: US 7,802,617 B2
(45) Date of Patent: Sep. 28, 2010

(54) HEAT DISSIPATION APPARATUS

(75) Inventors: Ching-Bai Hwang, Tu-Cheng (TW); Jin-Gong Meng, Shenzhen (CN); Ran Lin, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 1110 days.

(21) Appl. No.: 11/309,235

(22) Filed: Jul. 14, 2006

(65) Prior Publication Data

US 2008/0011461 A1 Jan. 17, 2008

(51) Int. Cl.
*H05K 7/20* (2006.01)

(52) U.S. Cl. .................... 165/122; 165/80.3; 361/697

(58) Field of Classification Search .............. 165/80.3, 165/104.33, 122; 361/697; 415/204, 208.1, 415/211.1
See application file for complete search history.

(56) References Cited

U.S. PATENT DOCUMENTS

| | | | | |
|---|---|---|---|---|
| 2,322,357 A | * | 6/1943 | Hagen | 415/204 |
| 2,841,326 A | * | 7/1958 | Davis | 415/97 |
| 5,738,492 A | * | 4/1998 | Stanko et al. | 415/211.1 |
| 6,688,379 B2 | * | 2/2004 | Huang et al. | 165/121 |
| 6,813,149 B2 | * | 11/2004 | Faneuf et al. | 361/679.49 |
| 6,917,521 B2 | * | 7/2005 | Tomioka et al. | 361/695 |
| 7,212,404 B2 | * | 5/2007 | Wang et al | 361/697 |
| 2004/0257764 A1 | * | 12/2004 | Jang | 361/687 |
| 2005/0214114 A1 | * | 9/2005 | Huang et al. | 415/206 |
| 2006/0078423 A1 | * | 4/2006 | Zheng | 415/206 |
| 2007/0084584 A1 | * | 4/2007 | Hashimoto | 165/80.3 |
| 2007/0256812 A1 | * | 11/2007 | Wei | 165/80.3 |
| 2007/0267172 A1 | * | 11/2007 | Hwang et al. | 165/80.3 |

FOREIGN PATENT DOCUMENTS

| | | | | |
|---|---|---|---|---|
| JP | 54057345 A | * | 5/1979 | |
| JP | 61153487 A | * | 7/1986 | |

* cited by examiner

*Primary Examiner*—Allen J Flanigan
(74) *Attorney, Agent, or Firm*—Jeffrey T. Knapp

(57) ABSTRACT

A heat dissipation apparatus (10) includes a centrifugal blower (12) and a fin assembly (11) having a plurality of fins (111) disposed at an air outlet (129) of the centrifugal blower. The centrifugal blower includes a first tongue (130) distant from the fin assembly, and a second tongue (131) located between the first tongue and the air outlet of the blower. The second tongue has an end (132) substantially parallel to the fins of the fin assembly to guide an airflow smoothly flowing through the fins.

20 Claims, 4 Drawing Sheets

HEAT DISSIPATION APPARATUS

FIELD OF THE INVENTION

The present invention relates generally to a heat dissipation apparatus, and more particularly to a heat dissipation apparatus for dissipating heat generated by electronic components.

DESCRIPTION OF RELATED ART

Following the increase in computer processing power that has been seen in recent years, greater emphasis is now being laid on increasing the efficiency and effectiveness of heat dissipation apparatus. Referring to FIG. 4, a heat dissipation apparatus 20 in accordance with related art includes a centrifugal blower 22 and a fin assembly 21 disposed at an air outlet 229 of the centrifugal blower 22. The fin assembly 21 includes a plurality of fins 211 which thermally connect with a heat generating electronic component (not shown) to absorb heat therefrom. The centrifugal blower 22 includes a casing 221, a stator (not shown) mounted in the casing 221, and a rotor 223 rotatably disposed around the stator. When the centrifugal blower 22 is activated, the rotor 223 rotates along a counterclockwise direction around the stator to drive airflow to flow through the fin assembly 21 to take away heat therefrom.

In operation of the heat dissipation apparatus 20, the airflow moves toward a left side of the air outlet 229 and leaves the centrifugal blower 22 thereat. A portion of the airflow flows toward a left side of the fin assembly 21 with the flow direction thereof substantially parallel to the fins 211 thereat. Another portion of the airflow flows toward a right side of the fin assembly 21 with an acute angle of attack formed between the flow direction of the airflow and each of the fins 211 thereat. An area circled by broken lines of FIG. 4, shows a portion of the fins 211, which forms the acute angles with the flow direction of the airflow. The airflow flowing toward that area of the fin assembly 21 is deflected by the fins 211 thereof due to the acute angles formed therebetween. This deflection of the airflow causes a loss in kinetic energy of the airflow. Thus, speed of the airflow flowing through that area of the fin assembly 21 is reduced. The heat dissipation efficiency of the heat dissipation apparatus 20 is thereby further reduced. Accordingly, it can be seen that the heat dissipation efficiency of the heat dissipation apparatus 20 has room for improvement.

SUMMARY OF THE INVENTION

The present invention relates to a heat dissipation apparatus for dissipating heat from a heat-generating electronic component. According to a preferred embodiment of the present invention, the heat dissipation apparatus includes a centrifugal blower and a fin assembly having a plurality of fins disposed at an air outlet of the centrifugal blower. The centrifugal blower includes a first tongue distant from the fin assembly, and a second tongue located between the first tongue and the air outlet of the blower. The second tongue has an end substantially parallel to the fins of the fin assembly to guide airflow smoothly flowing through the fins.

Other advantages and novel features of the present invention will become more apparent from the following detailed description of preferred embodiment when taken in conjunction with the accompanying drawings, in which:

DETAILED DESCRIPTION OF THE INVENTION

Figure 1:
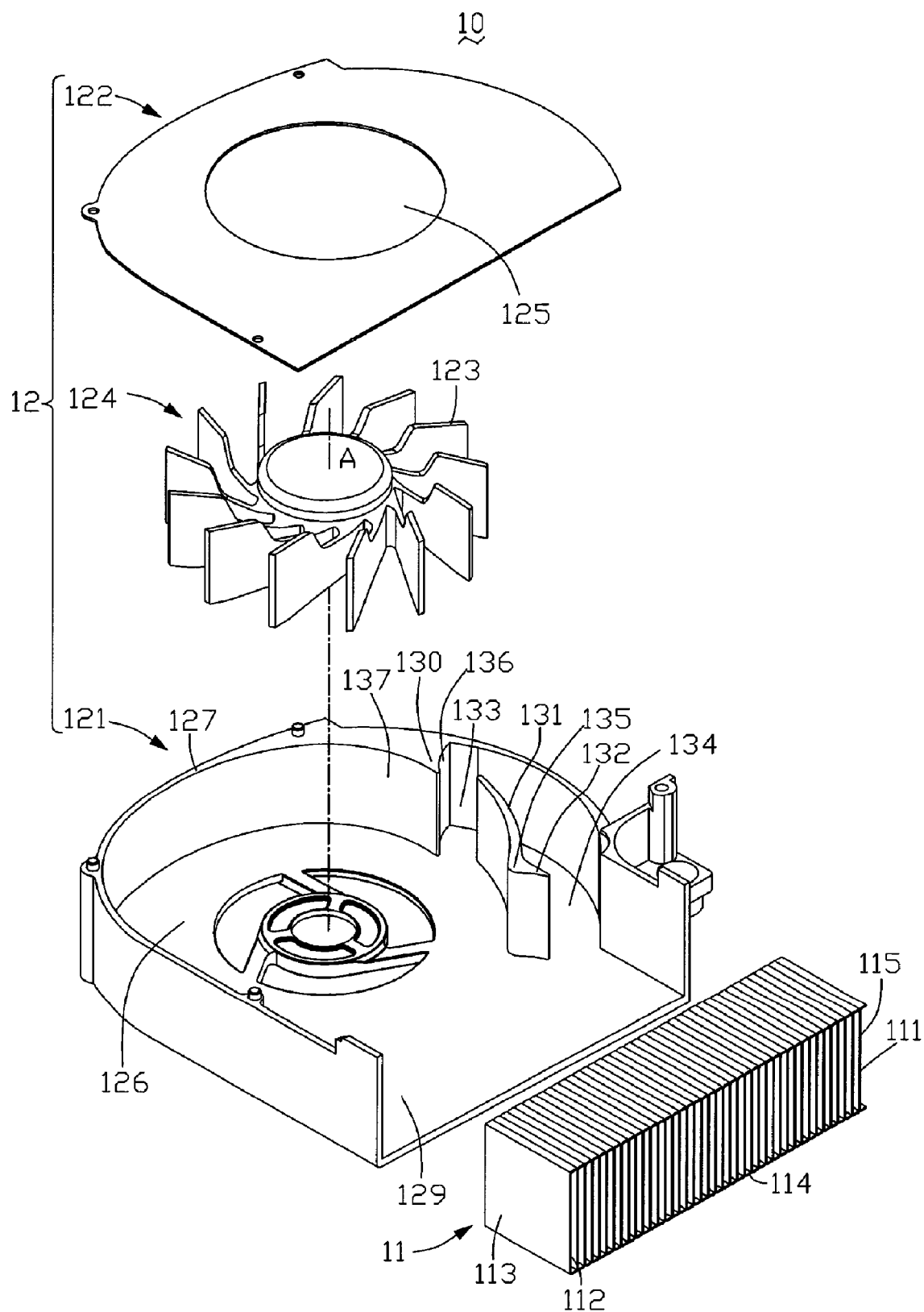
FIG. 1 is an exploded, isometric view of a heat dissipation apparatus according to a preferred embodiment of the present invention.
Figure 2:
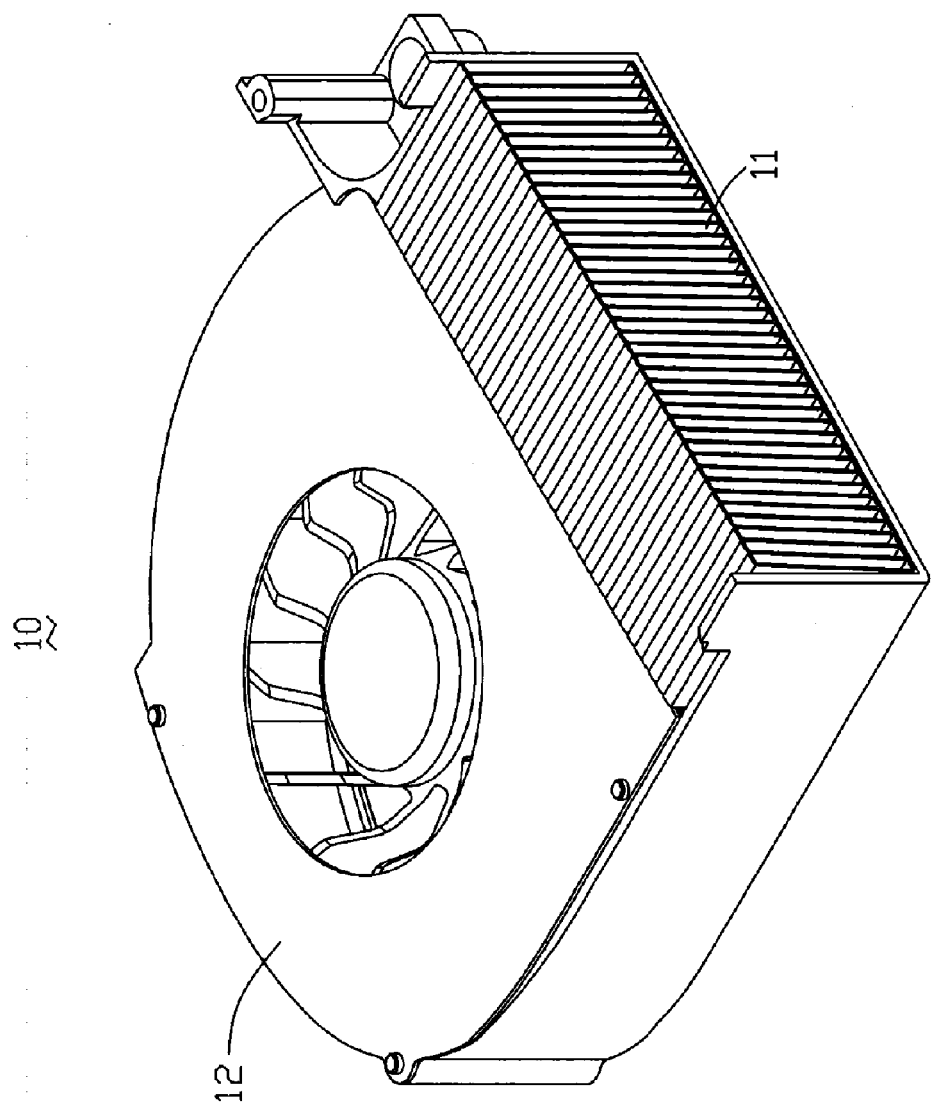
FIG. 2 is an assembled view of the heat dissipation apparatus of FIG. 1.

Referring to FIGS. 1 and 2, a heat dissipation apparatus 10 according to a preferred embodiment of the present invention includes a fin assembly 11, and a heat-dissipating fan 12. The fin assembly 11 includes a plurality of fins 111 thermally connected with a heat-generating component (not shown) for absorbing heat therefrom. The heat-dissipating fan 12 is a centrifugal blower for providing airflow with a high pressure flowing through the fin assembly 11 to take away heat therefrom.

The heat-dissipating fan 12 includes a housing 121, a cover 122 attached to the housing 121 with an inner space (not labeled) formed therebetween, a stator (not shown) accommodated in the inner space, and a rotor 124 including a plurality of blades 123 rotatably disposed around the stator along a counterclockwise direction.

The cover 122 defines a through hole therein functioning as an air inlet 125 of the heat-dissipating fan 12. The housing 121 includes a flat base plate 126 perpendicular to a rotation axis A of the rotor 124, and a volute sidewall 127 perpendicularly surrounding the base plate 126. An air channel 128 (FIG. 3) is formed between the blades 123 and an inner surface of the sidewall 127. The sidewall 127 of the housing 121 defines an opening therein functioning as an air outlet 129 of the heat-dissipating fan 12. The fin assembly 11 is disposed at the air outlet 129 of the heat-dissipating fan 12.

Figure 3:
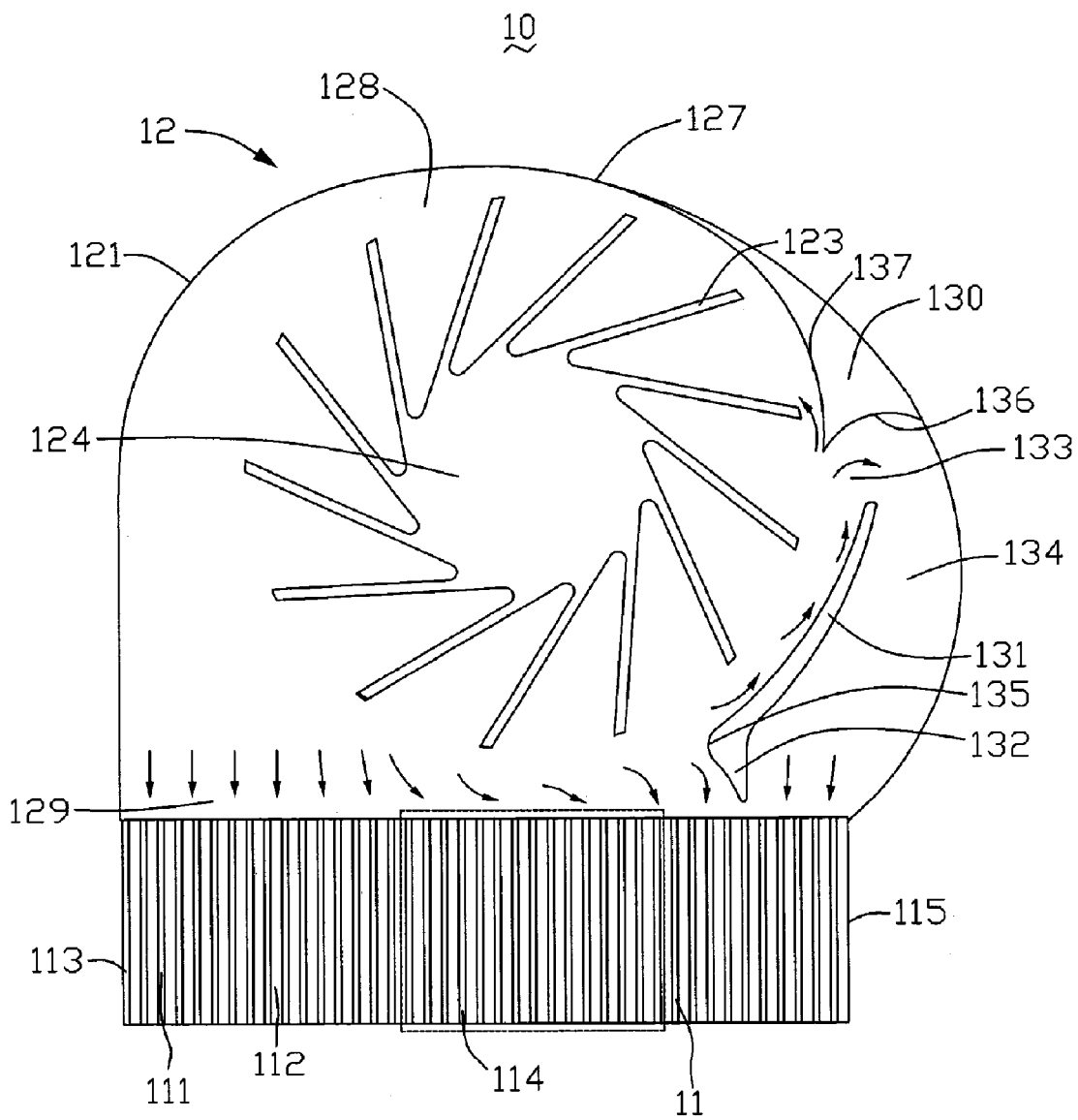
FIG. 3 is an explanatory view for explaining a flow direction of airflow generated by a heat-dissipating fan of the heat dissipation apparatus of FIG. 1.
Figure 4:
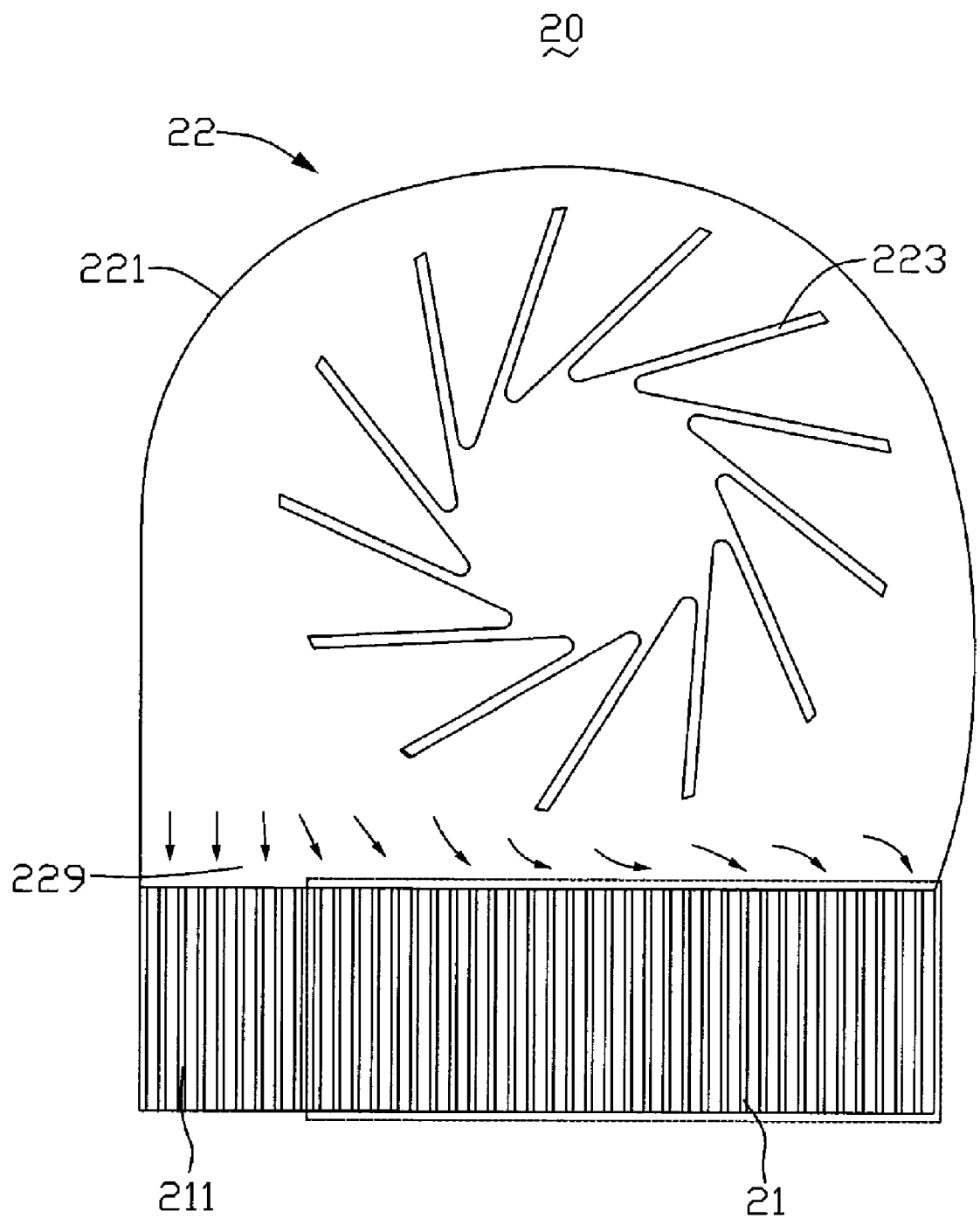
FIG. 4 is an explanatory view for explaining a flow direction of airflow generated by a heat-dissipating fan of a related heat dissipation apparatus.

The sidewall 127 of the housing 121 protrudes a triangle-shaped first tongue 130 at a position which is at a right side of the housing 121 as viewed from FIG. 3 and distant from the air outlet 129 and points towards the blades 123 of the rotor 124. The first tongue 130 includes a first arcuate surface 137 being a portion of the inner surface of the sidewall 127, and a second arcuate surface 136 extending from an end of the first arcuate surface 137 towards a position apart from the blades 123 of the rotor 124. A distance between the first arcuate surface 137 of the first tongue 130 and free ends of the blades 123 gradually increases along the rotation direction of the rotor 124. A joint of the first and second arcuate surfaces 137, 136 is disposed closest to the free ends of the blades 123 than the other portions of the first arcuate surface 137 to thereby increase air pressure of the airflow.

Also referring to FIG. 3, the base plate 126 of the housing 121 projects a second tongue 131 upwardly and between the first tongue 130 and the air outlet 129. The second tongue 131 is located in the housing 121 and separates the inner space of the housing 121 into a main chamber (not labeled) between the second tongue 131 and a left side of the sidewall 127 and a sub-channel 134 between the second tongue 131 and a right side of the sidewall 127. An end of the second tongue 131 spaces a distance from the first tongue 130 to thereby form an entrance 133 for the sub-channel 134. The second arcuate surface 136 of the first tongue 130 guides the airflow entering into the sub-channel 134 via the entrance 133 to decrease the air resistance of airflow. An opposite end 132 of the second tongue 131 is bent toward the air outlet 129 of the heat-dissipating fan 12 and substantially parallels to the fins 111 of the fin assembly 11. A bulge 135 is formed at the bending area of the second tongue 131, which is closest to the free ends of the blades 123 than the other portions of the second tongue, to thereby increase the air pressure. As shown in FIG. 3, the end of the second tongue 131 extending from the bulge 135 towards the first tongue 130 forms an angle with the tapered outer end 132 that extends oppositely from the bulge 135. A distance between a left side surface of the second tongue 131 and the free ends of the blades 123 gradually increases from the air outlet 129 towards the first tongue 130 as viewed from FIG. 3, whilst a distance between an opposite right side surface of the second tongue 131 and the sidewall 127 of the housing 121 gradually decreases from the bulge 135 towards the first tongue 130. That is, a width of the sub-channel 134 gradually increases from the first tongue 130 towards the bulge 135 of the second tongue 131.

The fins 111 of the fin assembly 11 are stacked together along a direction perpendicular to the rotation axis A of the rotor 124. Each of the fins 111 has a main body extending in a direction which is perpendicular to the direction along which the fins 111 are stacked. A plurality of air passages 112 are formed between two adjacent fins 111. The fin assembly 11 includes a left portion 113, a right portion 115, and a middle portion 114 located between the left and right portions 113, 115.

Particularly referring to FIG. 3, in operation of the heat-dissipating fan 12, the airflow generated by the rotation of the blades 123 flows through the bulge 135 of the second tongue 131 with its pressure being increased. The second tongue 131 guides the airflow to flow towards the first tongue 130. When the airflow leaves the second tongue 131, one part of the airflow enters into the sub-channel 134 via the entrance 133 and is guided toward right portion 115 of the fin assembly 11 along a direction substantially parallel to the fins 111 thereat. The other part of the airflow arrives at the joint of the first and second arcuate surfaces 137, 136 of the first tongue 130 with its pressure being further increased. The first arcuate surface 137 of the first tongue 130 and the sidewall 127 guides the other part of the airflow flowing through the air channel 128 towards the air outlet 129 of the heat-dissipating fan 12. When the airflow reaches the air outlet 129, one portion of the other part of the airflow flows towards the left portion 113 of the fin assembly 11 along a direction substantially parallel to the fins 111 thereat, whilst another portion of the other part of the airflow flows towards the middle portion 114 of the fin assembly 11 with acute angles formed between the flow direction of the airflow and the fins 111 of the middle portion 114 of the fin assembly 11. A division of the another portion of the other part of the airflow arrives at the second tongue 131 and is guided by the opposite end 132 of the second tongue 131 towards the middle portion 114 of the fin assembly 11 along a direction substantially parallel to the fins 111 thereat. Therefore, the airflow flowing towards the left, right, and middle portions 113, 115, 114 of the fin assembly 11 substantially parallels to the fins 111 thereof.

In the present invention, the airflow flowing towards the left, right, and middle portions 113, 115, 114 of the fin assembly 11 substantially parallels to the fins 111 thereof. A width of an area of the fin assembly 11 circled by the broken line of FIG. 3, shown the fins 111 forming the acute angles with the flow direction of the airflow, is narrower than a width of the area of the fin assembly 11 of the related heat dissipating apparatus 10. The airflow is therefore smoothly and evenly flowing through the air passages 112 of the fin assembly 11, which lowers the kinetic energy loss of the airflow when flowing through the fin assembly 11. The heat dissipating efficiency of the heat dissipation apparatus 10 is thus increased.

In the present invention, the heat-dissipating fan 12 includes two tongues, i.e. the first and second tongues 130, 131, with the second tongue 131 disposed at the air outlet 129 having an end 132 substantially parallel to the fins 111 of the fins assembly 111. Alternatively, the heat-dissipating fan may include more than two tongues, with at least one of the tongues disposed at the air outlet of the heat-dissipating fan having an end substantially parallel to the adjacent fins of the fins assembly. In addition, the second tongue 131 is disposed between the air outlet 129 and the first tongue 130. Alternatively, the more than two tongues may be arranged in other suitable manner.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heat dissipation apparatus comprising: a centrifugal blower comprising a housing and a rotor comprising a plurality of blades; and a fin assembly comprising a plurality of fins which are disposed at an air outlet of the centrifugal blower housing, the fins being stacked along a first direction to form the fin assembly, each of the fins extending along a second direction perpendicular to the first direction; wherein the centrifugal blower housing comprises a first tongue distant from the fin assembly, and a second tongue located between the first tongue and the air outlet of the blower housing, the second tongue having a bulge disposed between said rotor and said fins and oriented to divide air from said blades into two flow streams that flow either towards said fins or towards said first tongue; an inner end extending from said bulge towards said first tongue, and a tapered outer end extending from said bulge towards said fins and oriented substantially parallel to said second direction such that said inner and outer ends of said second tongue form an angle therebetween.

2. The heat dissipation apparatus as described in claim 1, wherein the first direction is perpendicular to a rotation axis of a rotor of the blower.

3. The heat dissipation apparatus as described in claim 1, wherein the outer end of the second tongue is distant from the first tongue.

4. The heat dissipation apparatus as described in claim 1, wherein the second tongue has a bulge formed between the inner end and the outer end and located adjacent to the air outlet, the bulge being closer to free ends of blades of the centrifugal blower than any other portion of the second tongue.

5. The heat dissipation apparatus as described in claim 1, wherein a distance between a surface of the second tongue near blades of the centrifugal blower and free ends of the blades gradually increases from the air outlet towards the first tongue.

6. The heat dissipation apparatus as described in claim 1, wherein the first tongue has a surface adjacent to blades of the centrifugal blower, and a distance between the adjacent surface and free ends of the blades gradually increases along a rotation direction of the blades of the blower.

7. The heat dissipation apparatus as described in claim 1, wherein the blower comprises a base plate and a sidewall surrounding the base plate, and the first tongue extends from the sidewall towards an inner side of the blower, whilst the second tongue is disposed on the base plate.

8. The heat dissipation apparatus as described in claim 7, wherein the second tongue spaces a distance from the sidewall to form a sub-channel therebetween, and the inner end of the second tongue spaces a distance from the first tongue to form an entrance, allowing an airflow to enter into the sub-channel.

9. The heat dissipation apparatus as described in claim 8, wherein a width of the sub-channel gradually increases from an end apart from the air outlet towards an opposite end adjacent to the air outlet.

10. A heat dissipation apparatus comprising: a blower comprising a housing and a rotor comprising a plurality of blades; and a fin assembly comprising a plurality of fins which are disposed at an air outlet of the blower housing; wherein the blower housing comprises at least two tongues, at least one of the at least two tongues is disposed adjacent to the fin assembly, the at least one tongue dividing the housing into a main chamber containing the rotor, and a sub channel; the at least one tongue having a bulge disposed between said rotor and said fins and oriented to divide air from said blades into two flow streams that flow either towards said fins or away from said fins towards an entrance of said sub channel, an inner end extending from said bulge away from said fins towards said entrance of said sub channel, and a tapered outer end extending from said bulge towards said fins and oriented substantially parallel to an extension direction of adjacent fins such that said inner and outer ends of said at least one tongue form an angle therebetween; wherein an airflow generated by the blower flows from the main chamber and from the sub channel through the fin assembly.

11. The heat dissipation apparatus as described in claim 10, wherein the at least two tongues comprise a first tongue distant from the fin assembly, and a second tongue comprising the outer end substantially parallel to the extending direction of the adjacent fins of the fin assembly and located between the first tongue and the air outlet of the blower and between two sides of the fin assembly.

12. The heat dissipation apparatus as described in claim 11, wherein the two chambers have a main chamber and a sub-channel with a size smaller than the main chamber.

13. The heat dissipation apparatus as described in claim 12, wherein a width of the sub-channel gradually increases from an end apart from the air outlet towards an opposite end adjacent to the air outlet.

14. The heat dissipation apparatus as described in claim 12, wherein an entrance for the airflow entering the sub-channel is defined between the first tongue and the second tongue.

15. The heat dissipation apparatus as described in claim 14, wherein the first tongue forms an arcuate surface facing the entrance for guiding the airflow to smoothly enter the sub-channel.

16. The heat dissipation apparatus as described in claim 11, wherein the second tongue has a bulge formed between the inner end and the outer end and located adjacent to the air outlet, and the bulge is closer to free ends of blades of the blower than any other portion of the second tongue.

17. The heat dissipation apparatus as described in claim 16, wherein a distance between a surface of the second tongue near the free ends of the blades and the free ends of the blades gradually increases from the bulge towards the first tongue.

18. The heat dissipation apparatus as described in claim 11, wherein the first tongue has a surface adjacent to blades of the blower, and a distance between the adjacent surface and free ends of the blades gradually increases along a rotation direction of the blades of the blower.

19. A heat dissipation apparatus comprising: a blower comprising a housing and a rotor comprising a plurality of blades; and a fin assembly comprising a plurality of fins which are disposed at an air outlet of the blower housing; said housing having therein a tongue, the tongue having a bulge disposed between said rotor and said fins and oriented to divide air from said blades into two flow streams that flow either towards said fins or away from said fins, an inner end extending from said bulge away from said fins towards an interior of said housing, and a tapered outer end extending from said bulge towards said fins and oriented substantially parallel to an extension direction of each of said fins such that said inner and outer ends of said tongue form an angle therebetween; wherein air leaving said rotor blades and impinging said bulge is either guided by said tapered outer end directly towards a first portion fins, or is guided to flow around said inner end of said tongue and potentially towards a second portion of said fins said fins.

20. The heat dissipation device as described in claim 19, wherein the blower further comprises an additional tongue, the tongue is located between the fin assembly and the additional tongue, and the additional tongue has an arcuate surface for guiding the another part of the airflow to flow smoothly through the fin assembly from the another portion of the fin assembly between the tongue and the second side of the fin assembly.

* * * * *